US012759660B2

(12) United States Patent
Chiba

(10) Patent No.: US 12,759,660 B2
(45) Date of Patent: Oct. 13, 2026

(54) BRAKE HYDRAULIC PRESSURE CONTROL APPARATUS AND STRADDLE-TYPE VEHICLE

(71) Applicant: Robert Bosch GmbH, Stuttgart (DE)

(72) Inventor: Kazuki Chiba, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 18/291,410

(22) PCT Filed: Jul. 13, 2022

(86) PCT No.: PCT/IB2022/056454

§ 371 (c)(1),
(2) Date: Jan. 23, 2024

(87) PCT Pub. No.: WO2023/007292

PCT Pub. Date: Feb. 2, 2023

(65) Prior Publication Data

US 2025/0100644 A1 Mar. 27, 2025

(30) Foreign Application Priority Data

Jul. 29, 2021 (JP) ................................ 2021-124366

(51) Int. Cl.
*B62J 45/00* (2020.01)
*B60T 13/66* (2006.01)
*B62L 3/02* (2006.01)

(52) U.S. Cl.
CPC ............. *B62J 45/00* (2020.02); *B60T 13/662* (2013.01); *B62L 3/023* (2013.01)

(58) Field of Classification Search
CPC .......... B62J 45/00; B60T 13/662; B62L 3/023
(Continued)

(56) References Cited

U.S. PATENT DOCUMENTS 5,040,853 A 8/1991 Burgdorf et al.
5,288,141 A * 2/1994 Isshiki .................... B60T 8/344 303/119.3
(Continued)

FOREIGN PATENT DOCUMENTS

EP 3753835 A1 12/2020
JP 2000197193 A 7/2000
(Continued)

OTHER PUBLICATIONS

International Search Report and Written Opinion for Application No. PCT/IB2022/056454 dated Oct. 13, 2022 (8 pages).

*Primary Examiner* — Christopher P Schwartz
(74) *Attorney, Agent, or Firm* — Michael Best & Friedrich LLP

(57) ABSTRACT

The present invention obtains a brake hydraulic pressure control apparatus that is mounted to a straddle-type vehicle and can improve an anti-vibration property when compared to the related art.

The brake hydraulic pressure control apparatus according to the present invention includes: a base body formed with a channel for a brake fluid; a control board of a hydraulic pressure control mechanism for the brake fluid provided to the channel; a housing accommodating the control board and connected to the base body; and a connector provided to the housing and electrically connected to the control board, and is mounted to the straddle-type vehicle. The brake hydraulic pressure control apparatus includes a holding section that holds a cable connected to the connector.

14 Claims, 5 Drawing Sheets

(58) Field of Classification Search
USPC ....... 137/884, 596.17; 251/129.15; 303/9.62, 303/9.64, 116.1, 116.2, 119.1–119.3
See application file for complete search history.

(56) References Cited

U.S. PATENT DOCUMENTS

| | | | | | |
|---|---|---|---|---|---|
| 5,725,290 | A * | 3/1998 | Thomas | B60T 8/3675 303/119.2 |
| 6,132,011 | A * | 10/2000 | Iwamura | B60T 8/368 303/119.2 |
| 12,116,079 | B2 * | 10/2024 | Atsushi | B62L 3/023 |
| 2008/0060889 | A1 | 3/2008 | Tsuruta | |
| 2018/0362004 | A1 | 12/2018 | Atsushi | |

FOREIGN PATENT DOCUMENTS

| | | | | |
|---|---|---|---|---|
| JP | 2014069779 A | 4/2014 | |
| JP | 2019137294 A | 8/2019 | |
| JP | 2021030996 A * | 3/2021 | B62L 3/023 |
| WO | 2016174531 A1 | 11/2016 | |

* cited by examiner

[FIG. 1]
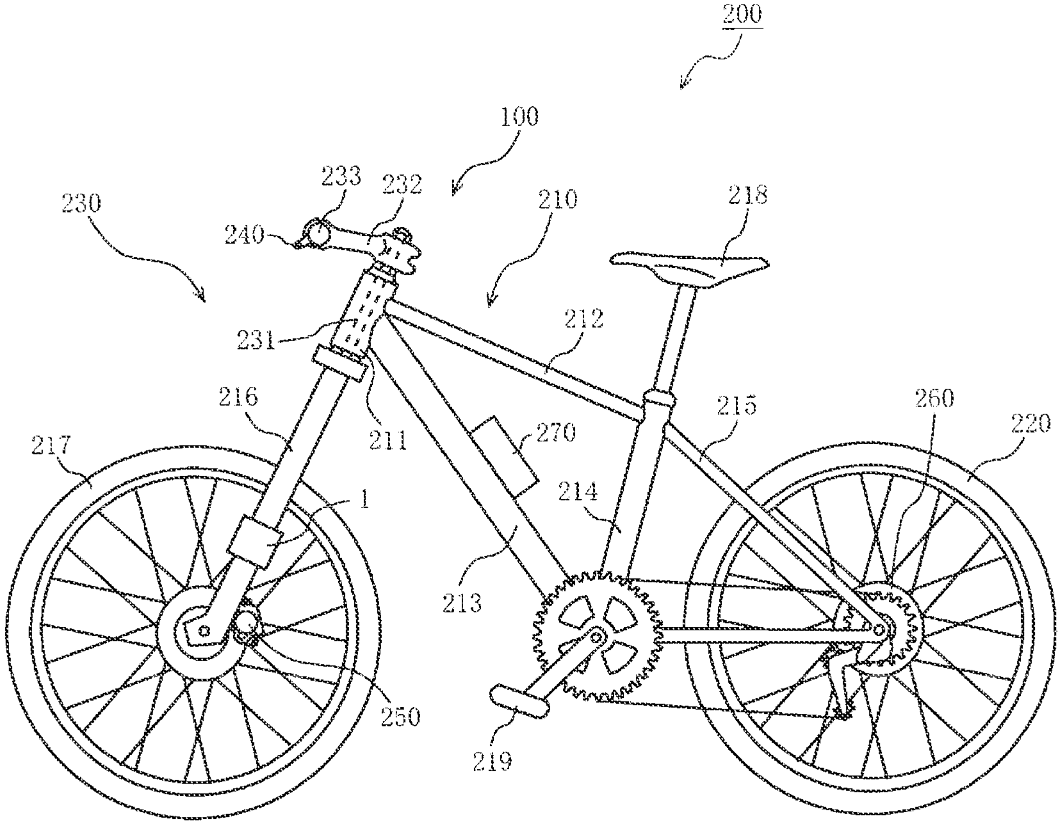

[FIG. 2]
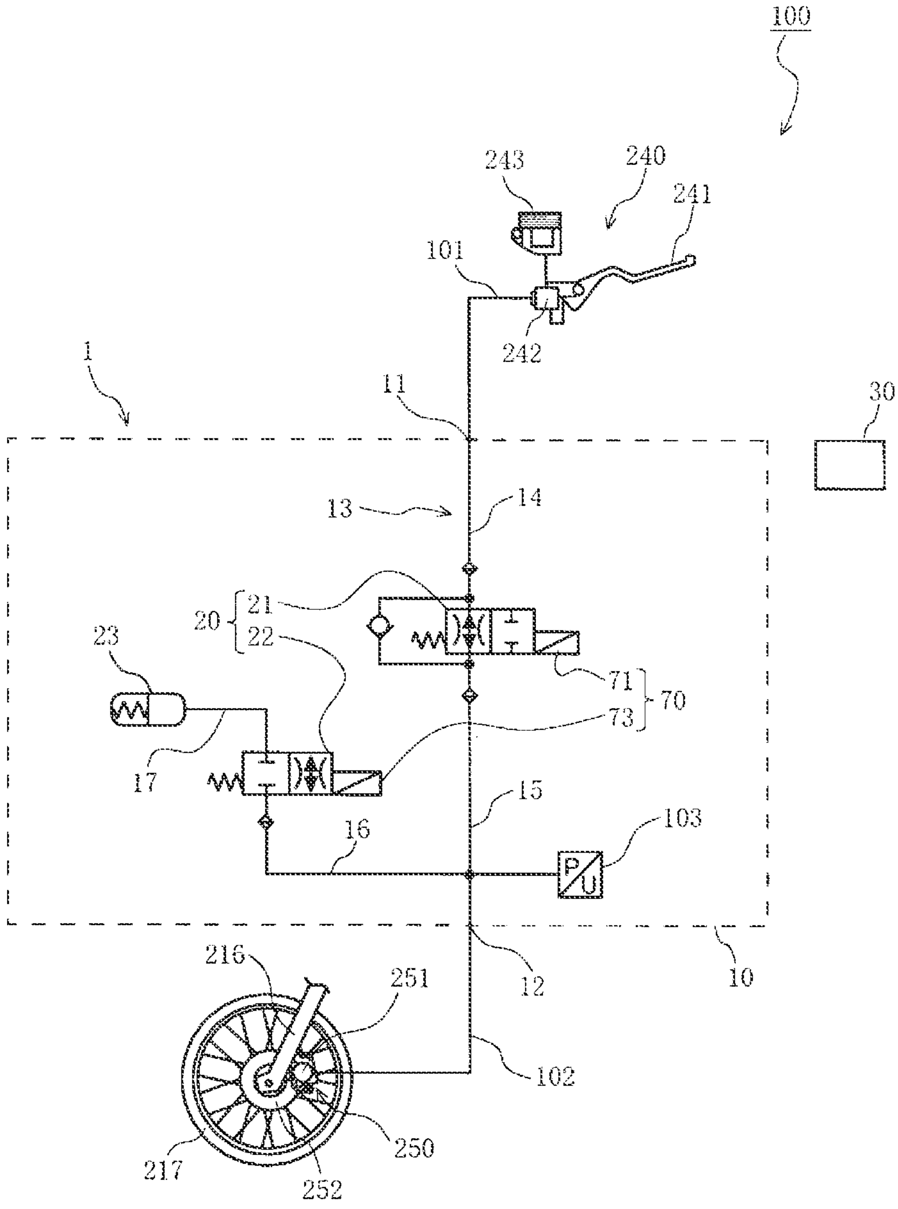

[FIG. 3]
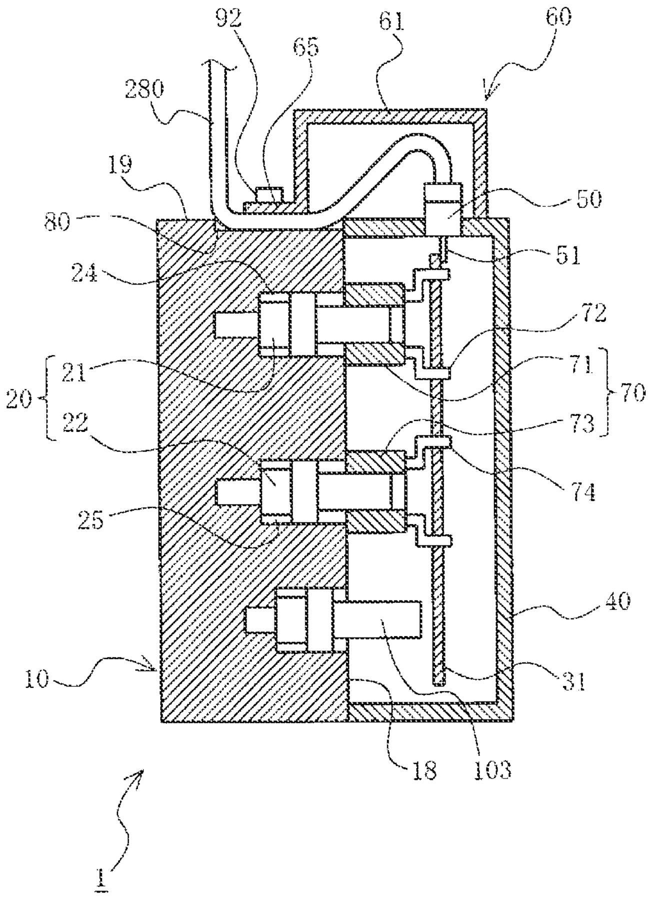
[FIG. 4]
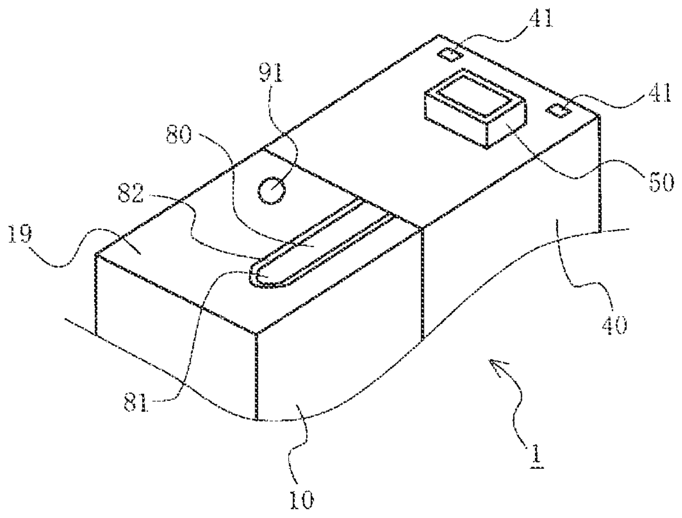

[FIG. 5]
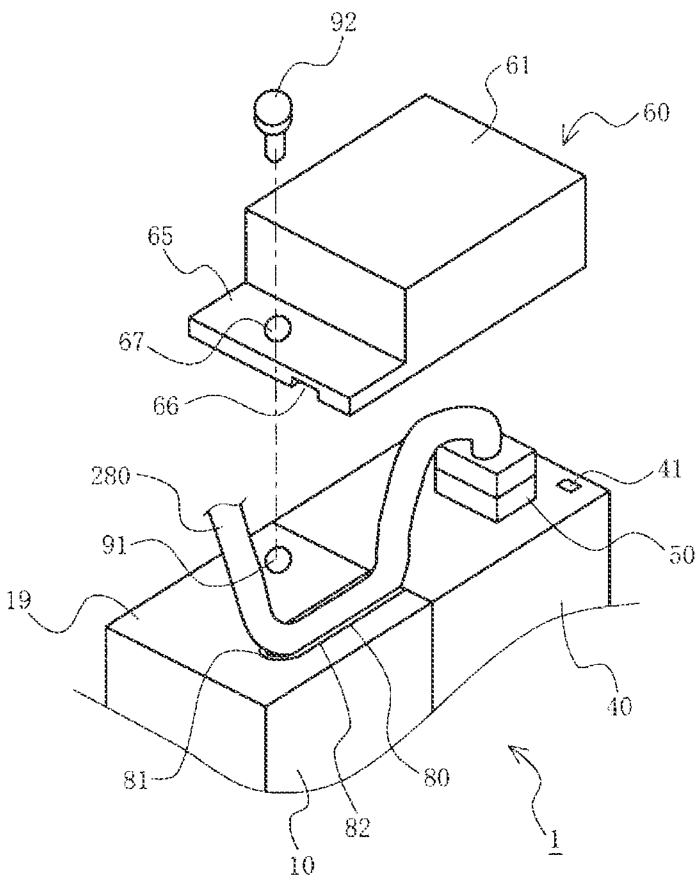
[FIG. 6]
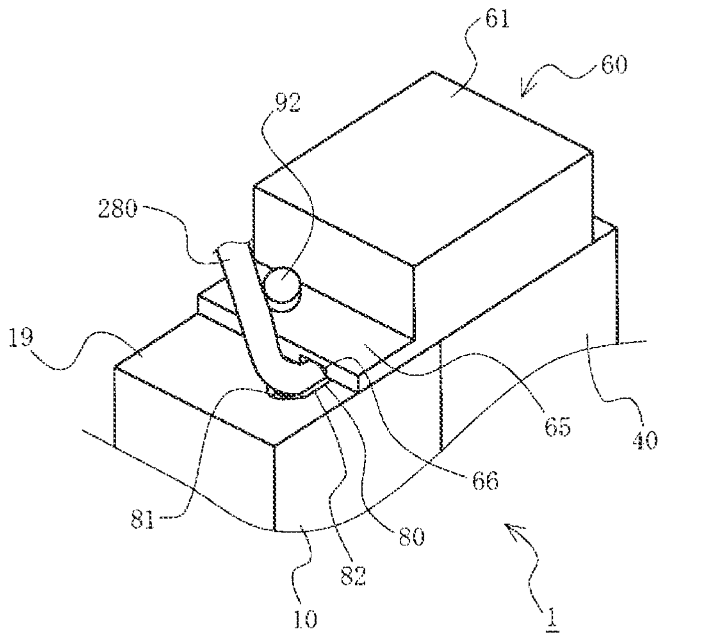

[FIG. 7]
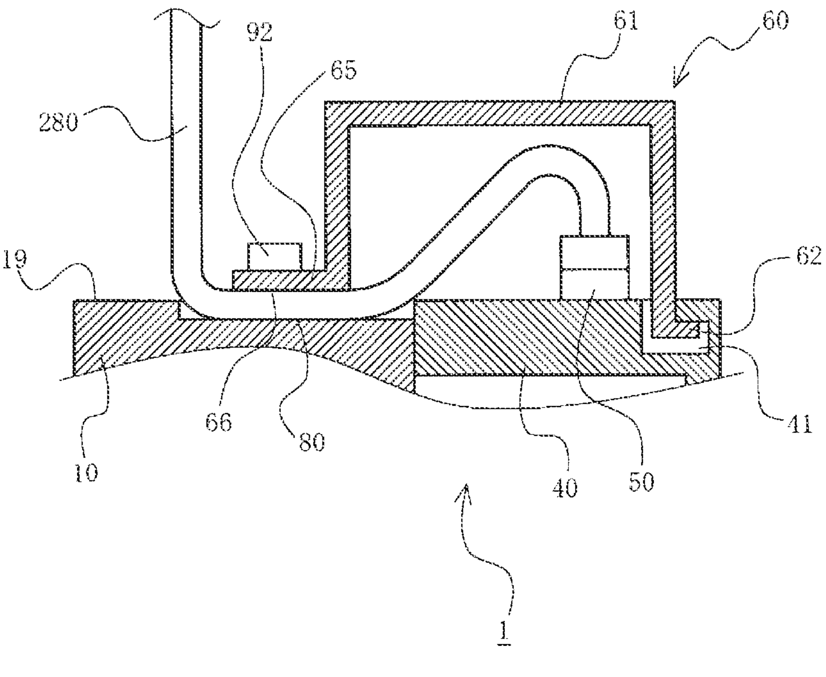

BRAKE HYDRAULIC PRESSURE CONTROL APPARATUS AND STRADDLE-TYPE VEHICLE

BACKGROUND

The present invention relates to a brake hydraulic pressure control apparatus for a straddle-type vehicle and a straddle-type vehicle including the brake hydraulic pressure control apparatus.

Conventionally, there are vehicles, each of which includes a brake hydraulic pressure control apparatus for causing a brake system to perform anti-lock braking operation. This brake hydraulic pressure control apparatus regulates a braking force that is generated on a wheel by increasing/reducing a pressure of a brake fluid in a brake fluid circuit in a state where a vehicle user operates an input section such as a brake lever. Among such brake hydraulic pressure control apparatuses, there is a brake hydraulic pressure control apparatus in which a channel constituting a part of the brake fluid circuit, a control board for controlling a flow of a brake fluid in the brake fluid circuit, and the like are unitized (for example, see JP-A-2014-069779).

More specifically, the unitized brake hydraulic pressure control apparatus includes: a base body that is formed with the channel for the brake fluid; the control board of a hydraulic pressure control mechanism for the brake fluid provided to the channel for the brake fluid; a housing that accommodates the control board and is connected to the base body; and a connector that is provided to the housing and is electrically connected to the control board. In addition, a cable, such as a power supply cable, that supplies electric power to the brake hydraulic pressure control apparatus is connected to the connector.

SUMMARY OF THE INVENTION

In recent years, a straddle-type vehicle as a type of the vehicle that includes the brake hydraulic pressure control apparatus for causing the brake system to perform the anti-lock braking operation has been proposed. Here, compared to a four-wheeled motor vehicle and the like, a distance between a front wheel and a rear wheel, that is, a wheel distance of the straddle-type vehicle is short. Accordingly, significant vibration tends to occur to the straddle-type vehicle due to irregularities of a road surface, or the like. For this reason, improvement in an anti-vibration property has been desired for the brake hydraulic pressure control apparatus that is mounted to the straddle-type vehicle.

The present invention has been made in view of the above-described problem as the background and therefore has a first purpose of obtaining a brake hydraulic pressure control apparatus that is mounted to a straddle-type vehicle and can improve an anti-vibration property when compared to the related art. The present invention has a second purpose of obtaining a straddle-type vehicle that includes such a brake hydraulic pressure control apparatus.

A brake hydraulic pressure control apparatus according to the present invention is a brake hydraulic pressure control apparatus that includes: a base body formed with a channel for a brake fluid; a control board of a hydraulic pressure control mechanism for the brake fluid provided to the channel; a housing accommodating the control board and connected to the base body; and a connector provided to the housing and electrically connected to the control board, and that is mounted to a straddle-type vehicle. The brake hydraulic pressure control apparatus includes a holding section that holds a cable connected to the connector.

A straddle-type vehicle according to the present invention includes the brake hydraulic pressure control apparatus according to the present invention.

The brake hydraulic pressure control apparatus according to the present invention includes the holding section that holds the cable connected to the connector. Accordingly, in the brake hydraulic pressure control apparatus according to the present invention, vibration that is transmitted from the straddle-type vehicle to the cable is blocked by the holding section, and is thereby prevented from being transmitted to the connector. Therefore, the brake hydraulic pressure control apparatus according to the present invention has improved reliability against the vibration in a connected portion between the connector and the cable, and thereby has a more improved anti-vibration property than the related art.

BRIEF DESCRIPTION OF THE DRAWINGS

FIG. 1 is a view illustrating a schematic configuration of a pedal-driven vehicle to which a brake system including a brake hydraulic pressure control apparatus according to an embodiment of the present invention is mounted.

FIG. 2 is a view illustrating a schematic configuration of the brake system according to the embodiment of the present invention.

FIG. 3 is a cross-sectional view of the brake hydraulic pressure control apparatus according to the embodiment of the present invention.

FIG. 4 is a perspective view illustrating a periphery of a connector in the brake hydraulic pressure control apparatus according to the embodiment of the present invention.

FIG. 5 is a perspective view illustrating the periphery of the connector in the brake hydraulic pressure control apparatus according to the embodiment of the present invention.

FIG. 6 is a perspective view illustrating the periphery of the connector in the brake hydraulic pressure control apparatus according to the embodiment of the present invention.

FIG. 7 is a cross-sectional view illustrating the periphery of the connector in the brake hydraulic pressure control apparatus according to the embodiment of the present invention.

DETAILED DESCRIPTION

A description will hereinafter be made on a brake hydraulic pressure control apparatus and a straddle-type vehicle according to the present invention with reference to the drawings.

The following description will be made on a case where the present invention is adopted for a pedal-driven vehicle (for example, a two-wheeled vehicle, a three-wheeled vehicle, or the like) as an example of the straddle-type vehicle. However, the present invention may be adopted for the straddle-type vehicle other than the pedal-driven vehicle. Examples of the straddle-type vehicle other than the pedal-driven vehicle are a two-wheeled motor vehicle, a three-wheeled motor vehicle, and an all-terrain vehicle, each of which has at least one of an engine and an electric motor as a drive source. The pedal-driven vehicle means a vehicle in general that can travel forward on a road by a depression force applied to pedals. That is, the pedal-driven vehicles include a normal pedal-driven vehicle, an electrically-assisted pedal-driven vehicle, an electric pedal-driven vehicle, and the like. The two-wheeled motor vehicle or the three-wheeled motor vehicle means a so-called motorcycle, and the motorcycles include a bike, a scooter, an electric scooter, and the like.

A configuration, operation, and the like, which will be described below, constitute merely one example, and each of the brake hydraulic pressure control apparatus and the straddle-type vehicle according to the present invention is not limited to a case with such a configuration, such operation, and the like. For example, the following description will be made on a case where the brake hydraulic pressure control apparatus according to the present invention is of a pumpless type. However, the brake hydraulic pressure control apparatus according to the present invention may include a pump that assists with a flow of a brake fluid. In addition, the following description will be made on a case where the brake system that includes the brake hydraulic pressure control apparatus according to the present invention executes anti-lock brake control only for a braking force generated on a front wheel. However, the brake system that includes the brake hydraulic pressure control apparatus according to the present invention may execute the anti-lock brake control only for a braking force generated on a rear wheel, or may execute the anti-lock brake control for both of the braking force generated on the front wheel and the braking force generated on the rear wheel.

In the drawings, the same or similar members or portions will be denoted by the same reference sign or will not be denoted by a reference sign. In addition, a detailed structure will appropriately be illustrated in a simplified manner or will not be illustrated. Furthermore, an overlapping description will appropriately be simplified or will not be made.

Mounting of Brake System Including Brake Hydraulic Pressure Control Apparatus to Pedal-Driven Vehicle A description will be made on mounting of a brake system that includes a brake hydraulic pressure control apparatus according to this embodiment to the pedal-driven vehicle.

FIG. 1 is a view illustrating a schematic configuration of the pedal-driven vehicle to which the brake system including the brake hydraulic pressure control apparatus according to the embodiment of the present invention is mounted. FIG. 1 illustrates a case where a pedal-driven vehicle 200 is the two-wheeled vehicle. However, the pedal-driven vehicle 200 may be another pedal-driven vehicle such as the three-wheeled vehicle.

The pedal-driven vehicle 200 as an example of the straddle-type vehicle includes a frame 210, a turning section 230, a saddle 218, a pedal 219, a rear wheel 220, and a rear-wheel braking section 260.

For example, the frame 210 includes: a head tube 211 that pivotally supports a steering column 231 in the turning section 230; a top tube 212 and a down tube 213, each of which is coupled to the head tube 211; a seat tube 214 that is coupled to the top tube 212 and the down tube 213 and holds the saddle 218; and a stay 215 that is coupled to upper and lower ends of the seat tube 214 and holds the rear wheel 220 and the rear-wheel braking section 260.

The turning section 230 includes: the steering column 231; a handlebar stem 232 that is held by the steering column 231; a handlebar 233 that is held by the handlebar stem 232; a brake operation section 240 that is attached to the handlebar 233; a front fork 216 that is coupled to the steering column 231; a front wheel 217 that is held in a freely rotatable manner by the front fork 216; and a front-wheel braking section 250. The front fork 216 is provided to each side of the front wheel 217. One end of the front fork 216 is coupled to the steering column 231, and the other end thereof is connected to a center of rotation of the front wheel 217.

The brake operation section 240 includes: a mechanism that is used as an operation section of the front-wheel braking section 250; and a mechanism that is used as an operation section of the rear-wheel braking section 260. For example, the mechanism that is used as the operation section of the front-wheel braking section 250 is disposed on a right end side of the handlebar 233, and the mechanism that is used as the operation section of the rear-wheel braking section 260 is disposed on a left end side of the handlebar 233.

The thus-configured pedal-driven vehicle 200 includes a brake hydraulic pressure control apparatus 1. In this embodiment, the brake hydraulic pressure control apparatus 1 is attached to the front fork 216 in the turning section 230. The brake hydraulic pressure control apparatus 1 may be attached directly to the front fork 216 or may be attached indirectly to the front fork 216 via a bracket or the like. The brake hydraulic pressure control apparatus 1 is a unit that governs control of a hydraulic pressure of a brake fluid in the front-wheel braking section 250. The rear-wheel braking section 260 may be a braking section of a type that generates a braking force by increasing the hydraulic pressure of the brake fluid, or may be a braking section of a type that mechanically generates the braking force (for example, a braking section of a type that generates the braking force by generating a tensile force to a wire, or the like).

The pedal-driven vehicle 200 includes a power supply unit 270 as a power supply for the brake hydraulic pressure control apparatus 1. For example, the power supply unit 270 is attached to the down tube 213 of the frame 210. The power supply unit 270 may be a battery or may be a generator. Examples of the generator are: a generator that generates electrical power by travel of the pedal-driven vehicle 200 (for example, a hub dynamo that generates the electrical power by rotation of the front wheel 217 or the rear wheel 220, a generator that also serves as a motor for a drive source of the front wheel 217 or the rear wheel 220 and generates regenerative power, or the like); and a generator that generates electric power by solar light.

That is, a brake system 100 is mounted to the pedal-driven vehicle 200, and the brake system 100 at least includes the brake operation section 240, the front-wheel braking section 250, the brake hydraulic pressure control apparatus 1, and the power supply unit 270. The brake system 100 can execute anti-lock brake control by controlling the hydraulic pressure of the brake fluid in the front-wheel braking section 250 by the brake hydraulic pressure control apparatus 1.

Configuration of Brake System

A description will be made on a configuration of the brake system according to the embodiment.

FIG. 2 is a view illustrating a schematic configuration of the brake system according to the embodiment of the present invention.

The brake hydraulic pressure control apparatus 1 includes a base body 10. The base body 10 is formed with a master cylinder port 11, a wheel cylinder port 12, and a channel 13 that communicates the master cylinder port 11 and the wheel cylinder port 12 with each other.

The channel 13 is a channel for a brake fluid. The channel 13 includes a first channel 14, a second channel 15, a third channel 16, and a fourth channel 17. The master cylinder port 11 and the wheel cylinder port 12 communicate with each other via the first channel 14 and the second channel 15. In addition, an end portion on an inlet side of the third channel 16 is connected to an intermediate portion of the second channel 15.

The brake operation section 240 is connected to the master cylinder port 11 via a fluid pipe 101. The brake operation section 240 includes a brake lever 241, a master cylinder 242, and a reservoir 243. The master cylinder 242 includes a piston section (not illustrated) that moves in an interlocking manner with an operation of the brake lever 241 by a user, and is connected to an inlet side of the first channel 14 via the fluid pipe 101 and the master cylinder port 11. With movement of the piston section, the hydraulic pressure of the brake fluid in the first channel 14 is increased or reduced. The reservoir 243 stores the brake fluid for the master cylinder 242.

The front-wheel braking section 250 is connected to the wheel cylinder port 12 via a fluid pipe 102. The front-wheel braking section 250 includes a wheel cylinder 251 and a rotor 252. The wheel cylinder 251 is attached to a lower end portion of the front fork 216. The wheel cylinder 251 includes a piston section (not illustrated) that moves in an interlocking manner with the hydraulic pressure in the fluid pipe 102, and is connected to an outlet side of the second channel 15 via the fluid pipe 102 and the wheel cylinder port 12. The rotor 252 is held by the front wheel 217 and rotates with the front wheel 217. When a brake pad (not illustrated) is pressed against the rotor 252 due to movement of the piston section, the front wheel 217 brakes.

The brake hydraulic pressure control apparatus 1 includes: a hydraulic pressure regulation valve 20 that opens/closes the channel 13; and a coil 70 that drives the hydraulic pressure regulation valve 20. In this embodiment, the brake hydraulic pressure control apparatus 1 includes, as the hydraulic pressure regulation valve 20, an inlet valve 21 and an outlet valve 22. The inlet valve 21 is provided between an outlet side of the first channel 14 and an inlet side of the second channel 15 and allows/blocks a flow of the brake fluid between the first channel 14 and the second channel 15. The outlet valve 22 is provided between an outlet side of the third channel 16 and an inlet side of the fourth channel 17 and allows/blocks a flow of the brake fluid between the third channel 16 and the fourth channel 17. The hydraulic pressure of the brake fluid is controlled by opening/closing operation of each of the inlet valve 21 and the outlet valve 22.

In this embodiment, the brake hydraulic pressure control apparatus 1 includes, as the coils 70, a coil 71 that drives the inlet valve 21 and a coil 73 that drives the outlet valve 22. For example, when the coil 71 is in an unenergized state, the inlet valve 21 allows a bidirectional flow of the brake fluid. Then, when the coil 71 is energized, the inlet valve 21 is brought into a closed state and blocks the flow of the brake fluid. That is, in this embodiment, the inlet valve 21 is an electromagnetic valve that is opened when not being energized. Meanwhile, for example, when the coil 73 is in an unenergized state, the outlet valve 22 blocks the flow of the brake fluid. Then, when the coil 73 is energized, the outlet valve 22 is brought into an open state and allows the bidirectional flow of the brake fluid. That is, in this embodiment, the outlet valve 22 is an electromagnetic valve that is closed when not being energized.

The brake hydraulic pressure control apparatus 1 includes an accumulator 23. The accumulator 23 is connected to an outlet side of the fourth channel 17 and stores the brake fluid that has flowed through the outlet valve 22.

The brake hydraulic pressure control apparatus 1 includes a hydraulic pressure sensor 103 that detects the hydraulic pressure of the brake fluid in the wheel cylinder 251. The hydraulic pressure sensor 103 is provided to the second channel 15 or the third channel 16.

The brake hydraulic pressure control apparatus 1 includes a control section 30. The control section 30 receives signals from various sensors such as the hydraulic pressure sensor 103 and a wheel rotational frequency sensor (not illustrated) that detects a rotational frequency of the front wheel 217. Portions of the control section 30 may be disposed collectively or may be disposed separately. The control section 30 may be configured to include a microcomputer, a microprocessor unit, or the like, may be configured to include one whose firmware and the like can be updated, or may be configured to include a program module or the like that is executed by a command from a CPU or the like, for example.

The control section 30 controls the energization of the coil 71 and the coil 73. In detail, the control section 30 controls the energization of the coil 71 and thereby controls driving (the opening/closing operation) of the inlet valve 21. In addition, the control section 30 controls the energization of the coil 73 and thereby controls driving (the opening/closing operation) of the outlet valve 22. That is, by controlling the opening/closing operation of each of the inlet valve 21 and the outlet valve 22, the control section 30 controls the hydraulic pressure of the brake fluid in the wheel cylinder 251, that is, the braking force on the front wheel 217.

In this embodiment, of the configuration of the control section 30, at least a configuration to control the energization of the coil 71 and the coil 73 is governed by a control board 31, which will be described later. That is, by controlling the energization of the coil 71 and the coil 73, the control board 31 controls driving of the inlet valve 21 and the outlet valve 22. Here, in this embodiment, components, such as the hydraulic pressure regulation valve 20 and the coil 70, that are used at the time of controlling the hydraulic pressure of the brake fluid in the channel 13 may collectively be referred to as a hydraulic pressure control mechanism for the brake fluid. As described above, the control board 31 controls each of the components constituting the hydraulic pressure control mechanism for the brake fluid. That is, it can also be said that the brake hydraulic pressure control apparatus 1 according to this embodiment includes the control board 31 of the hydraulic pressure control mechanism for the brake fluid.

For example, in the case where the control section 30 determines that the front wheel 217 is locked or possibly locked on the basis of the signal from the wheel rotational frequency sensor (not illustrated) at the time when the front wheel 217 brakes due to the operation of the brake lever 241 by the user, the control section 30 initiates the anti-lock brake control.

Once initiating the anti-lock brake control, the control section 30 brings the coil 71 into an energized state, closes the inlet valve 21, and blocks the flow of the brake fluid from the master cylinder 242 to the wheel cylinder 251, so as to prevent an increase in the hydraulic pressure of the brake fluid in the wheel cylinder 251. Meanwhile, the control section 30 brings the coil 73 into an energized state, opens the outlet valve 22, and allows the flow of the brake fluid from the wheel cylinder 251 to the accumulator 23, so as to reduce the hydraulic pressure of the brake fluid in the wheel cylinder 251. In this way, the front wheel 217 unlocks, or locking thereof is avoided. In the case where the control section 30 determines, on the basis of the signal from the hydraulic pressure sensor 103, that the hydraulic pressure of the brake fluid in the wheel cylinder 251 is reduced to a specified value, the control section 30 brings the coil 73 into the unenergized state to close the outlet valve 22, and brings the coil 71 into the unenergized state to open the inlet valve 21 for a short period of time, so as to increase the hydraulic pressure of the brake fluid in the wheel cylinder 251. The control section 30 may increase/reduce the hydraulic pressure of the brake fluid in the wheel cylinder 251 only once or may repeatedly increase/reduce the hydraulic pressure of the brake fluid in the wheel cylinder 251 for a plurality of times.

When the anti-lock brake control is terminated and the brake lever 241 returns, the inside of the master cylinder 242 is brought into an atmospheric pressure state, and the brake fluid in the wheel cylinder 251 returns. In addition, when the anti-lock brake control is terminated and the brake lever 241 returns, the outlet valve 22 is opened. When the hydraulic pressure of the brake fluid in the channel 13 becomes lower than the hydraulic pressure of the brake fluid stored in the accumulator 23, the brake fluid that is stored in the accumulator 23 is discharged to the outside of the accumulator 23 without the hydraulic pressure thereof being increased (that is, in a pumpless manner), then returns into the channel 13, and eventually returns to the master cylinder 242.

Configuration of Brake Hydraulic Pressure Control Apparatus

The brake hydraulic pressure control apparatus 1 includes the base body 10, the hydraulic pressure regulation valve 20, the coil 70, the control board 31, and a housing 40. A description will hereinafter be made on a configuration of the brake hydraulic pressure control apparatus 1 according to this embodiment.

FIG. 3 is a cross-sectional view of the brake hydraulic pressure control apparatus according to the embodiment of the present invention.

The base body 10 is a component that is made of metal such as aluminum alloy. The base body 10 is substantially rectangular-parallelepiped, for example. Each surface of the base body 10 may be flat, may include a curved portion, or may include a step. The coil 71 and the coil 73 as the coils 70 are vertically provided to a surface 18 of this base body 10.

In detail, as described above, the brake hydraulic pressure control apparatus 1 according to this embodiment includes, as the hydraulic pressure regulation valves 20, the inlet valve 21 and the outlet valve 22. Meanwhile, the base body 10 is formed with a recessed section 24 and a recessed section 25. In the recessed section 24, the outlet side of the first channel 14 and the inlet side of the second channel 15 communicate with each other, and the inlet valve 21 is provided in a freely movable manner. Then, when the inlet valve 21 moves inside the recessed section 24, the flow of the brake fluid between the first channel 14 and the second channel 15 is allowed/blocked. In the recessed section 25, the outlet side of the third channel 16 and the inlet side of the fourth channel 17 communicate with each other, and the outlet valve 22 is provided in a freely movable manner. Then, when the outlet valve 22 moves inside the recessed section 25, the flow of the brake fluid between the third channel 16 and the fourth channel 17 is allowed/blocked.

In the state where the inlet valve 21 is provided to the recessed section 24, a part of the inlet valve 21 is projected to the outside of the base body 10 from the surface 18. The coil 71 that drives the inlet valve 21 is vertically provided to the surface 18 of the base body 10 in a manner to surround the projected portion of the inlet valve 21. Similarly, in the state where the outlet valve 22 is provided to the recessed section 25, a part of the outlet valve 22 is projected to the outside of the base body 10 from the surface 18. The coil 73 that drives the outlet valve 22 is vertically provided to the surface 18 of the base body 10 in a manner to surround the projected portion of the outlet valve 22.

The control board 31 that controls the energization of the coil 71 and the coil 73 is electrically connected to the coil 71 and the coil 73. In this embodiment, the control board 31 is electrically connected to the coil 71 via a connection terminal 72, and is electrically connected to the coil 73 via a connection terminal 74.

The housing 40 is made of resin, for example, and is connected to the base body 10. The housing 40 accommodates the coil 70 and the control board 31. In this embodiment, the housing 40 is connected to the surface 18 of the base body 10. In addition, as described above, the brake hydraulic pressure control apparatus 1 according to this embodiment includes the hydraulic pressure sensor 103. In this embodiment, the hydraulic pressure sensor 103 is also accommodated in the housing 40.

The housing 40 according to this embodiment is provided with a connector 50 that is electrically connected to the control board 31. In this embodiment, the connector 50 is electrically connected to the control board 31 via a connection terminal 51. A cable 280 is connected to this connector 50. For example, the cable 280 is a power supply cable that is connected to the power supply unit 270. In this case, the electric power is supplied to the control board 31 via the cable 280. In addition, for example, the cable 280 is a signal cable connected to the sensor such as the wheel rotational frequency sensor. In this case, a detection signal by the sensor is input to the control board 31 via the cable 280.

Although the only one connector 50 is illustrated in FIG. 3, the number of the connector 50 provided to the brake hydraulic pressure control apparatus 1 is not limited to one. In other words, although the only one cable 280 is connected to the brake hydraulic pressure control apparatus 1 in FIG. 3, the number of the cable 280 connected to the brake hydraulic pressure control apparatus 1 is not limited to one. The brake hydraulic pressure control apparatus 1 may include the plural connectors 50. In other words, the plural cables 280 may be connected to the brake hydraulic pressure control apparatus 1.

Furthermore, the brake hydraulic pressure control apparatus 1 according to this embodiment includes a holding section 65 that holds an intermediate portion of the cable 280. Although the only one cable 280 is held by the holding section 65 in FIG. 3, the holding section 65 may hold the plural cables 280. In addition, a step of holding the cable 280 by the holding section 65 may be executed before the cable 280 and the connector 50 are connected or after the cable 280 and the connector 50 are connected.

Compared to the four-wheeled motor vehicle and the like, a distance between the front wheel and the rear wheel, that is, a wheel distance of the straddle-type vehicle such as the pedal-driven vehicle 200 is short. Accordingly, significant vibration tends to occur due to irregularities of a road surface, or the like. For this reason, improvement in an anti-vibration property has been desired for the brake hydraulic pressure control apparatus that is mounted to the straddle-type vehicle. To handle this, the brake hydraulic pressure control apparatus 1 according to this embodiment includes the above-described holding section 65. In the brake hydraulic pressure control apparatus 1 according to this embodiment, which includes the holding section 65, the vibration that is transmitted from the pedal-driven vehicle 200 to the cable 280 is blocked by the holding section 65, and is thereby prevented from being transmitted to the connector 50. For this reason, the brake hydraulic pressure control apparatus 1 according to this embodiment has improved reliability against the vibration in a connected portion between the connector 50 and the cable 280, and thereby has the more improved anti-vibration property than the related art.

In particular, in this embodiment, the brake hydraulic pressure control apparatus 1 is attached to the front fork 216. The front fork 216 directly receives the vibration from the road surface. For this reason, use of the brake hydraulic pressure control apparatus 1 according to this embodiment as the brake hydraulic pressure control apparatus that is attached to the front fork 216 is particularly preferred.

Here, the brake hydraulic pressure control apparatus 1 according to this embodiment includes a connector cover 60 that protects the connector 50. More specifically, the connector cover 60 includes a cover section 61 that covers the connector 50. The holding section 65 is formed integrally with the connector cover 60. In other words, a part of the connector cover 60 functions as the holding section 65. By configuring the holding section 65, just as described, it is possible to reduce the number of the components of the brake hydraulic pressure control apparatus 1 and thus can reduce cost for the brake hydraulic pressure control apparatus 1. In addition, by configuring the holding section 65, just as described, it is possible to hold the cable 280 by the holding section 65 when the connector cover 60 is attached. Therefore, by configuring the holding section 65, just as described, it is possible to reduce assembly man-hours required for the brake hydraulic pressure control apparatus 1. It is needless to say that the connector cover 60 and the holding section 65 may be separate components.

In this embodiment, it is configured that the cable 280 is held by the base body 10 and the holding section 65. That is, in this embodiment, the cable 280 is held between the base body 10 and the holding section 65. The cable 280 may be held by the housing 40 and the holding section 65. However, by adopting the configuration to hold the cable 280 by the base body 10 and the holding section 65, the following effects can be obtained.

Since the base body 10 is formed with the channel 13 for the brake fluid, rigidity thereof is higher than the housing 40. Thus, when the brake hydraulic pressure control apparatus 1 is attached to the pedal-driven vehicle 200, the base body 10 is attached to the pedal-driven vehicle 200. Accordingly, in the case where it is configured to hold the cable 280 by the housing 40 and the holding section 65, and some kind of force is applied to the cable 280, this force is also applied to the housing 40, and a load is applied to a connected portion between the base body 10 and the housing 40. For this reason, in the case where it is configured that the cable 280 is held by the housing 40 and the holding section 65, it may be concerned that a sealing property of the connected portion between the base body 10 and the housing 40 deteriorates at the time when the certain type of force is applied to the cable 280. However, in the case where it is configured that the cable 280 is held by the base body 10 and the holding section 65, the load is not applied to the connected portion between the base body 10 and the housing 40 even when the certain type of force is applied to the cable 280. Therefore, in the case where it is configured that the cable 280 is held by the base body 10 and the holding section 65, it is possible to prevent the sealing property of the connected portion between the base body 10 and the housing 40 from deteriorating.

FIG. 4 to FIG. 6 are perspective views illustrating a periphery of the connector in the brake hydraulic pressure control apparatus according to the embodiment of the present invention. FIG. 7 is a cross-sectional view illustrating the periphery of the connector in the brake hydraulic pressure control apparatus according to the embodiment of the present invention. FIG. 4 illustrates a state where the cable 280 is not connected to the connector 50. FIG. 5 illustrates a state where the cable 280 is connected to the connector 50 and the cable 280 is not held by the holding section 65. FIG. 6 and FIG. 7 illustrate a state where the cable 280 is connected to the connector 50 and the cable 280 is held by the holding section 65.

A description will hereinafter be made on a preferred detailed configuration around the holding section 65 with reference to these FIG. 4 to FIG. 7.

In the case of a configuration in which the cable 280 is held by the base body 10 and the holding section 65, the base body 10 is preferably formed with a first groove 80, to which the intermediate portion of the cable 280 is fitted. Then, the holding section 65 is preferably configured to hold a portion of the cable 280, the portion being arranged in the first groove 80. In addition, in the case of a configuration in which the cable 280 is held by the housing 40 and the holding section 65, the housing 40 is preferably formed with the first groove 80, to which the intermediate portion of the cable 280 is fitted. Then, the holding section 65 is preferably configured to hold the portion, which is arranged to the first groove 80, in the cable 280.

Since the first groove 80 is formed, just as described, it is possible to temporarily hold the cable 280 by fitting the intermediate portion of the cable 280 into the first groove 80. In this way, a worker no longer has to hold the cable 280 with one hand during work of holding the cable 280 by the holding section 65. Therefore, formation of the first groove 80 facilitates the work of holding the cable 280 by the holding section 65.

In order to temporarily hold the cable 280 by the first groove 80, a width of the first groove 80 needs to be in such a dimension that is less than an outer diameter of the cable 280 and allows fitting of the cable 280. At this time, each of the cables 280 has an individual dimensional error. There also exists a machining error of the first groove 80. Thus, in order to temporarily hold the cable 280 by the first groove 80, it is necessary to set the width of the first groove 80 to the above-described width while the dimensional error of the cable 280 and the machining error of the first groove 80 are taken into consideration. For this reason, the first groove 80 is preferably formed in a component that is made of a material easily machined with a high degree of accuracy. Therefore, in the case where the base body 10 is made of metal, the first groove 80 is preferably formed to the base body 10.

In the case where the first groove 80 is formed to the base body 10 or the housing 40, the holding section 65 is preferably formed with a second groove 66, in which the intermediate portion of the cable 280 is inserted, to a portion opposing the first groove 80. In this way, compared to a case where the holding section 65 is not formed with the second groove 66, the first groove 80 can have a shallow depth, and the component that is formed with the first groove 80 can be downsized. Accordingly, since the holding section 65 is formed with the second groove 66, the brake hydraulic pressure control apparatus 1 can be downsized in comparison with the brake hydraulic pressure control apparatus 1 to which the holding section 65 is not formed with the second groove 66.

On an outer periphery of the first groove 80, a chamfered section 82 is preferably provided at least to an area not opposing the holding section 65. The cable 280, which is wired around the pedal-driven vehicle 200 to the vicinity of the brake hydraulic pressure control apparatus 1, is bent and fitted into the first groove 80. At this time, the cable 280 is bent within the area not opposing the holding section 65, that is, an area where the cable 280 is not held by the holding section 65. Accordingly, on the outer periphery of the first groove 80, the area not opposing the holding section 65 is likely to contact the cable 280. As described above, since the chamfered section 82 is formed to the outer peripheral portion of the first groove 80, the cable 280 comes into contact with the chamfered section 82 even when the cable 280 touches the outer periphery of the first groove 80. Thus, since the chamfered section 82 is provided to the outer peripheral portion of the first groove 80, just as described, it is possible to prevent damaging the outer peripheral portion of the cable 280.

In the case where the base body 10 is formed with the first groove 80, a distal end 81 as an end of the first groove 80 on a far side from the connector 50 is preferably arranged at a position described below. In the base body 10, a holding surface 19 holds the cable 280 together with the holding section 65. In this case, the first groove 80 is formed to the holding surface 19. At this time, preferably, the distal end 81 is arranged to the holding surface 19 and does not communicate with a surface of the base body 10 that continues from the holding surface 19. In other words, preferably, the distal end 81 does not communicate with the surfaces other than the holding surface 19. As described above, the cable 280 that is fitted into the first groove 80 is bent within the area not opposing the holding section 65, that is, the area where the cable 280 is not held by the holding section 65. At this time, by arranging the distal end 81 to the holding surface 19, the cable 280 is automatically bent at the distal end 81 when the cable 280 is fitted into the first groove 80. Therefore, the arrangement of the distal end 81 to the holding surface 19 facilitates attachment work of the brake hydraulic pressure control apparatus 1 to the pedal-driven vehicle 200.

In the case where a part of the connector cover 60 serves as the holding section 65, the connector cover 60 preferably includes a hook 62 to be hooked onto the housing 40. It is preferably configured that the connector cover 60 is screwed and fixed to the housing 40 or the base body 10 in a state where the hook 62 is hooked onto the housing 40. For example, a configuration to fix such a connector cover 60 can be obtained as follows.

More specifically, as illustrated in FIG. 7, for example, the housing 40 includes the at least one hook 62 at an opposite end from the holding section 65. Here, in an example illustrated in FIG. 4 to FIG. 7, the housing 40 includes the two hooks 62. In addition, the housing 40 is formed with the same number of recessed sections 41, in each of which the hook 62 is inserted, as the hooks 62. In other words, each of the hooks 62, which is inserted in the respective recessed section 41, is hooked onto an edge of the same respective recessed section 41. Furthermore, for example, the housing 40 or the base body 10 is formed with at least one female screw 91. In the example illustrated in FIG. 4 to FIG. 7, the one female screw 91 is formed to the holding surface 19 of the base body 10. In the connector cover 60, a through-hole 67 is formed at a portion opposing the female screw 91. In the example illustrated in FIG. 4 to FIG. 7, the through-hole 67 is formed to the holding section 65. With such a configuration, a male screw 92 that is inserted into the through-hole 67 is threaded into the female screw 91 in the state where the hook 62 is hooked onto the edge of the recessed section 41. In this way, the connector cover 60 can be screwed and fixed to the base body 10.

By adopting such a fixing configuration as the configuration to fix the connector cover 60, it is possible to reduce the number of times of screwing at the time of fixing the connector cover 60 and thus easily fix the connector cover 60. In addition, by adopting such a fixing configuration as the configuration to fix the connector cover 60, it is possible to apply the load, which is applied to the connector cover 60 at the time of screwing, to the cable 280 with the hook 62 being a fulcrum when the connector cover 60 is screwed and fixed. Accordingly, by adopting such a fixing configuration as the configuration to fix the connector cover 60, it is possible to further reliably hold the cable 280.

Effects of Brake Hydraulic Pressure Control Apparatus

A description will be made on effects of the brake hydraulic pressure control apparatus according to the embodiment.

The brake hydraulic pressure control apparatus 1 according to this embodiment is the brake hydraulic pressure control apparatus that is mounted to the pedal-driven vehicle 200. The brake hydraulic pressure control apparatus 1 includes the base body 10, the control board 31, the housing 40, and the connector 50. The base body 10 is formed with the channel 13 for the brake fluid. The control board 31 is the control board of the hydraulic pressure control mechanism for the brake fluid that is provided to the channel 13. The housing 40 accommodates the control board 31 and is connected to the base body 10. The connector 50 is provided to the housing 40 and is electrically connected to the control board 31. The brake hydraulic pressure control apparatus 1 includes the holding section 65 that holds the cable 280 connected to the connector 50.

Compared to the four-wheeled motor vehicle and the like, the distance between the front wheel and the rear wheel, that is, the wheel distance of the straddle-type vehicle such as the pedal-driven vehicle 200 is short. Accordingly, the significant vibration tends to occur due to the irregularities of the road surface, or the like. For this reason, the improvement in the anti-vibration property has been desired for the brake hydraulic pressure control apparatus that is mounted to the straddle-type vehicle. In the brake hydraulic pressure control apparatus 1 according to this embodiment, the vibration that is transmitted from the pedal-driven vehicle 200 to the cable 280 is blocked by the holding section 65, and is thereby prevented from being transmitted to the connector 50. For this reason, the brake hydraulic pressure control apparatus 1 according to this embodiment has the improved reliability against the vibration in the connected portion between the connector 50 and the cable 280, and thereby has the more improved anti-vibration property than the related art.

The description has been made so far on the brake hydraulic pressure control apparatus 1 according to this embodiment. However, the brake hydraulic pressure control apparatus according to the present invention is not limited to that in the description of this embodiment, and only parts of the configuration described in this embodiment may appropriately be combined and implemented.

REFERENCE SIGNS LIST

1: Brake hydraulic pressure control apparatus
10: Base body
11: Master cylinder port
12: Wheel cylinder port
13: Channel
14: First channel
15: Second channel
16: Third channel
17: Fourth channel
18: Surface
19: Holding surface
20: Hydraulic pressure regulation valve
21: Inlet valve
22: Outlet valve
23: Accumulator
24: Recessed section
25: Recessed section
30: Control section
31: Control board
40: Housing
41: Recessed section
50: Connector
51: Connection terminal
60: Connector cover
61: Cover section
62: Hook
65: Holding section
66: Second groove
67: Through-hole
70: Coil
71: Coil
72: Connection terminal
73: Coil
74: Connection terminal
80: First groove
81: Distal end
82: Chamfered section
91: Female screw
92: Male screw
100: Brake system
101: Fluid pipe
102: Fluid pipe
103: Hydraulic pressure sensor
200: Pedal-driven vehicle
210: Frame
211: Head tube
212: Top tube
213: Down tube
214: Seat tube
215: Stay
216: Front fork
217: Front wheel
218: Saddle
219: Pedal
220: Rear wheel
230: Turning section
231: Steering column
232: Handlebar stem
233: Handlebar
240: Brake operation section
241: Brake lever
242: Master cylinder
243: Reservoir
250: Front-wheel braking section
251: Wheel cylinder
252: Rotor
260: Rear-wheel braking section
270: Power supply unit
280: Cable

The invention claimed is:

1. A brake hydraulic pressure control apparatus (1) mounted to a straddle-type vehicle, the brake hydraulic pressure control apparatus (1) including:

a base body (10) that is formed with a channel (13) for a brake fluid;

a control board (31) of a hydraulic pressure control mechanism for the brake fluid that is provided to the channel (13);

a housing (40) that accommodates the control board (31) and is connected to the base body (10); and a connector (50) that is provided to the housing (40) and is electrically connected to the control board (31), the brake hydraulic pressure control apparatus (1) comprising:

a holding section (65) that holds a cable (280) connected to the connector (50), and a connector cover (60) that has a cover section (61) for covering the connector (50), wherein a part of the connector cover (60) functions as the holding section (65), wherein the connector cover (60) includes a hook (62) that is hooked onto the housing (40), and wherein the connector cover is configured to be fixed to the housing (40) or the base body (10) in a state where the hook (62) is hooked onto the housing (40).

2. The brake hydraulic pressure control apparatus (1) according to claim 1, wherein the cable (280) is configured to be held by the base body (10) and the holding section (65).

3. The brake hydraulic pressure control apparatus (1) according to claim 2, wherein the base body (10) is made of metal, the base body (10) is formed with a first groove (80) into which an intermediate portion of the cable (280) is fitted, and the holding section (65) is configured to hold a portion of the cable (280), the portion being arranged in the first groove (80).

4. The brake hydraulic pressure control apparatus (1) according to claim 3, wherein in the case where a holding surface (19) of the base body (10) holds the cable (280) together with the holding section (65), and an end of the first groove (80) on a far side from the connector (50) is set as a distal end (81), the first groove (80) is formed to the holding surface (19), and the distal end (81) is arranged to the holding surface (19) and does not communicate with a surface of the base body (10) that continues from the holding surface (19).

5. The brake hydraulic pressure control apparatus (1) according to claim 3, wherein on an outer periphery of the first groove (80), a chamfered section (82) is provided at least to an area not opposing the holding section (65).

6. The brake hydraulic pressure control apparatus (1) according to claim 3, wherein the holding section (65) is formed with a second groove (66), into which the intermediate portion of the cable (280) is inserted, to a portion opposing the first groove (80).

7. The brake hydraulic pressure control apparatus (1) according to claim 1, wherein the housing (40) is made of resin.

8. The brake hydraulic pressure control apparatus (1) according to claim 7, wherein the base body (10) is made of metal.

9. The brake hydraulic pressure control apparatus (1) according to claim 8, wherein the holding section (65) is fixed to the base body (10) by a screw.

10. The brake hydraulic pressure control apparatus (1) according to claim 1, wherein the apparatus is mounted to a front fork (216) of the straddle-type vehicle.

11. The brake hydraulic pressure control apparatus (1) according to claim 1, wherein the straddle-type vehicle is a motorcycle.

12. The brake hydraulic pressure control apparatus (1) according to claim 1, wherein the straddle-type vehicle is a pedal-driven vehicle (200).

13. The brake hydraulic pressure control apparatus (1) according to claim 1, wherein the housing (40) is formed with a first groove (80) into which an intermediate portion of the cable (280) is fitted, and the holding section (65) is configured to hold a portion of the cable (280), the portion being arranged to the first groove (80).

14. A straddle-type vehicle comprising:

the brake hydraulic pressure control apparatus (1) according to claim 1.

* * * * *